United States Patent
Sharma et al.

(10) Patent No.: US 11,272,374 B2
(45) Date of Patent: Mar. 8, 2022

(54) MAKE-BEFORE-BREAK GRANT SWITCHING

(71) Applicant: ARRIS Enterprises LLC, Suwanee, GA (US)

(72) Inventors: Ravi Sharma, Santa Clara, CA (US); Awaiz Khan, Milpitas, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 186 days.

(21) Appl. No.: 16/798,531

(22) Filed: Feb. 24, 2020

(65) Prior Publication Data

US 2021/0266751 A1    Aug. 26, 2021

(51) Int. Cl.
| | |
|---|---|
| *H04W 16/14* | (2009.01) |
| *H04W 88/06* | (2009.01) |
| *H04W 84/12* | (2009.01) |
| *H04W 12/08* | (2021.01) |
| *H04W 24/10* | (2009.01) |
| *H04W 72/04* | (2009.01) |
| *H04L 12/26* | (2006.01) |
| *H04W 72/12* | (2009.01) |
| *H04B 17/318* | (2015.01) |
| *H04L 5/00* | (2006.01) |
| *H04L 43/10* | (2022.01) |

(52) U.S. Cl.
CPC .......... *H04W 16/14* (2013.01); *H04B 17/318* (2015.01); *H04L 5/0048* (2013.01); *H04L 43/10* (2013.01); *H04W 12/08* (2013.01); *H04W 24/10* (2013.01); *H04W 72/0453* (2013.01); *H04W 72/1215* (2013.01); *H04W 84/12* (2013.01); *H04W 88/06* (2013.01)

(58) Field of Classification Search
CPC ..... H04W 16/14; H04W 88/06; H04W 12/08; H04W 24/10; H04L 43/10
See application file for complete search history.

(56) References Cited

U.S. PATENT DOCUMENTS

| | | | |
|---|---|---|---|
| 10,893,417 B1 * | 1/2021 | Gandhi | H04W 16/14 |
| 2019/0104489 A1 * | 4/2019 | Huang | H04W 60/00 |
| 2020/0106577 A1 * | 4/2020 | Chen | H04W 72/14 |
| 2021/0234964 A1 * | 7/2021 | Khawer | H04M 15/66 |

\* cited by examiner

*Primary Examiner* — Mohammad S Anwar
(74) *Attorney, Agent, or Firm* — Steven Stupp; Stewart Wiener

(57) ABSTRACT

During operation, the radio node may identify a second portion of a shared-license-access (SLA) band of frequencies with an improved communication-performance metric relative to a first portion of the SLA band of frequencies, which is currently approved and authorized for use. In response, the radio may provide a grant request to the computer for the second portion of the SLA band of frequencies, and may receive a grant response from the computer with an approval for a grant to the second portion of the SLA band of frequencies. Then, the radio node may provide a heartbeat request to the computer requesting authorization to use the second portion of the SLA band of frequencies, and may receive a heartbeat response from the computer with the authorization. Next, the radio node may provide a relinquishment request to the computer for the first portion of the SLA band of frequencies.

15 Claims, 5 Drawing Sheets

MAKE-BEFORE-BREAK GRANT SWITCHING

BACKGROUND

Field

The described embodiments relate to techniques for communicating information among electronic devices. Notably, the described embodiments relate to techniques for switching between spectrum grants that are approved and authorized by a spectrum allocation server (SAS).

Related Art

While many electronic devices communicate with each other via large networks owned by a network operator, small-scale networks associated with entities (such as a company or an organization) are increasingly common. In principle, the small-scale network complements the service offered by the network operator and can offer improved communication performance, such as in a particular venue or environment. In practice, the communication performance of small-scale networks (and large networks) is often constrained by resources, such as bandwidth in a shared communication channel.

In order to address these constraints, additional bands of frequencies are being used by large networks and small-scale networks. For example, a shared-license-access (SLA) band of frequencies near 3.5 GHz (notably, the 150 MHz of bandwidth between 3.55 GHz and 3.7 GHz) is being used for general-purpose communication. This SLA band of frequencies is referred to as 'Citizens Broadband Radio Service' or CBRS.

In CBRS, a radio node (which is sometimes referred to as a 'Citizens Band Service Device' or CBSD) may provide a grant request to a SAS (a cloud-based service that manages wireless communication in the CBRS) to reserve a portion of the spectrum or bandwidth in the SLA band of frequencies for its use. For example, a radio node may request a grant to reserve 5 MHz of spectrum from the SAS. If the requested portion of the SLA band of frequencies is available, the SAS may provide a grant response to the radio node with approval of a grant for the requested portion of the SLA band of frequencies. Then, the radio node may provide a heartbeat request to the SAS to request authorization to transmit in the granted portion of the SLA band of frequencies. When the radio node receives a subsequent heartbeat response from the SAS, the radio node is authorized to transmit in the granted portion of the SLA band of frequencies.

However, the grant-approval and authorization process can make it difficult to optimize the communication performance in a network that includes the radio node. Notably, the time delays and uncertainty in receiving grant approval and subsequent authorization from the SAS are often obstacles to updating a requested portion of SLA band of frequencies, because of degraded service while the requested portion of the spectrum is not available for use.

SUMMARY

A radio node that dynamically changes portions of an SLA band of frequencies is described. This radio node includes: a first node or connector that can be communicatively coupled to an antenna or an antenna element; a second node or connector that can be communicatively coupled to a network; an interface circuit that communicates with a computer; and a network circuit that communicates with an electronic device. During operation, the interface circuit transmits packets or frames addressed to the electronic device using a first portion of the SLA band of frequencies, where the first portion of the SLA band of frequencies is approved and authorized for use by the radio node. Then, the interface circuit identifies a second portion of the SLA band of frequencies with an improved communication-performance metric relative to the first portion of the SLA band of frequencies. Moreover, the network circuit provides, addressed to the computer, a grant request for the second portion of the SLA band of frequencies. Next, the network circuit receives a grant response associated with the computer, where the grant response includes approval for a grant to the second portion of the SLA band of frequencies. Furthermore, the network circuit provides, addressed to the computer, a heartbeat request for authorization to use the second portion of the SLA band of frequencies. In response, the network circuit receives a heartbeat response associated with the computer that authorizes the radio node to use the second portion of the SLA band of frequencies. Additionally, after receiving the approval and the authorization for the second portion of the SLA band of frequencies, the network circuit provides, addressed to the computer, a relinquishment request for the first portion of the SLA band of frequencies.

Note that the computer may include a SAS. Moreover, a given portion of the SLA band of frequencies may be included in a CBRS.

Moreover, the network circuit may receive a relinquishment response associated with the computer that approves the relinquishment request.

Furthermore, identifying the second portion of the SLA band of frequencies may involve performing a network listen in the second portion of the SLA band of frequencies. Additionally, the communication-performance metric may include one of: a received signal strength indication (RSSI) of a carrier signal, or a reference signals received power (RSRP) of the carrier signal.

In some embodiments, after receiving the authorization for the second portion of the SLA band of frequencies and prior to providing the relinquishment request, the interface circuit provides, addressed to the electronic device, a notification of a transition from the first portion of the SLA band of frequencies to the second portion of the SLA band of frequencies. For example, the notification may be provided in a system information block.

Additionally, the communication with the computer may use wired communication.

Note that the radio node may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than Long Term Evolution), etc.

Another embodiment provides the computer.

Another embodiment provides the electronic device.

Another embodiment provides a computer-readable storage medium with program instructions for use with the radio node. When executed by the radio node, the program instructions cause the radio node to perform at least some of the aforementioned operations in one or more of the preceding embodiments.

Another embodiment provides a method, which may be performed by the radio node. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
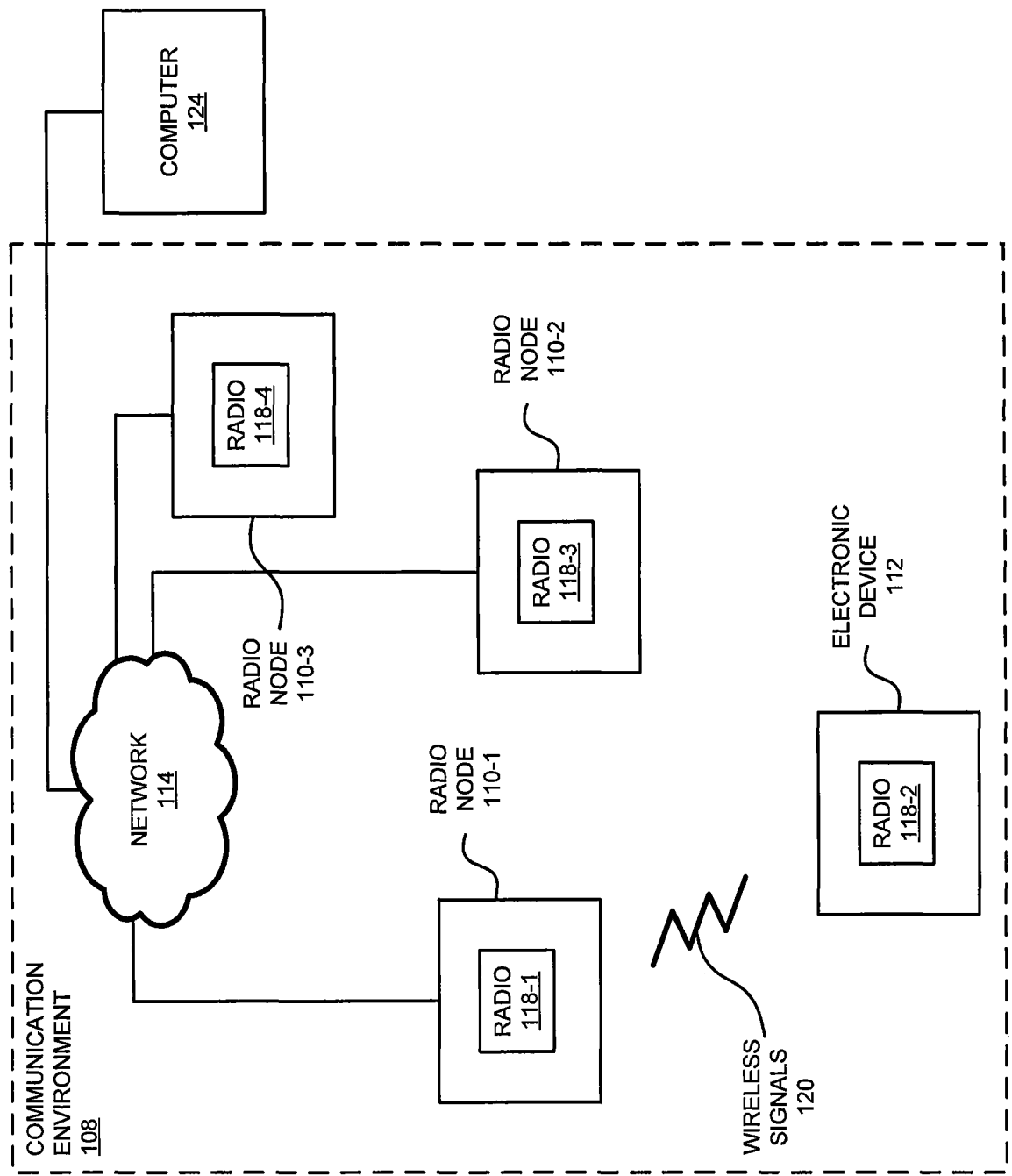
FIG. 1 is a block diagram illustrating an example of communication among a computer, radio nodes and electronic devices in a system in accordance with an embodiment of the present disclosure.

A radio node that dynamically changes portions of an SLA band of frequencies is described. During operation, the radio node may identify a second portion of the SLA band of frequencies with an improved communication-performance metric relative to a first portion of the SLA band of frequencies, which is currently approved and authorized for use by the radio. For example, the second portion of the SLA band of frequencies may have an improved RSSI or RSRP of a carrier signal. In response, the radio may provide a grant request to the computer for the second portion of the SLA band of frequencies, and may receive a grant response from the computer with an approval for a grant to the second portion of the SLA band of frequencies. Then, the radio node may provide a heartbeat request to the computer requesting authorization to use the second portion of the SLA band of frequencies, and may receive a heartbeat response from the computer with the authorization. Next, the radio node may provide a relinquishment request to the computer for the first portion of the SLA band of frequencies.

By dynamically changing the portion of the SLA band of frequencies, this communication technique may allow the radio node to improve or optimize communication performance in a network without disrupting service. Notably, the communication technique may allow the radio node to relinquish the first portion of the SLA band of frequencies after use of the second portion of the SLA band of frequencies has been approved and authorized. Consequently, the make-before-break grant switching may ensure that there is no transient adverse impact associated with the transition from the first portion of the SLA band of frequencies to the second portion of the SLA band of frequencies.

We now describe some embodiments of the communication technique. A cellular-telephone network may include base stations (and associated cell towers) that implement so-called 'macrocells.' These macrocells may facilitate communication with hundreds of users (such as hundreds of cellular telephones) over distances of kilometers. In general, the positioning of the cell towers (and the antennas) is carefully designed and optimized to maximize the performance of the cellular-telephone network (such as the throughput, the capacity, the block error rate, etc.) and to reduce crosstalk or interference between the signals transmitted by different cell towers and/or different macrocells. Small cells are generally radio access nodes providing lower power than macrocells and therefore providing smaller coverage areas than macrocells. It is common to subcategorize 'small cells' even further by ascribing relative general ranges. For example, a 'macrocell' might have a range of less than 2 kilometers, a "picocell" less than 200 meters, and a 'femtocell' on the order of 10 meters. These descriptions are for general relative comparison purposes and should not be limiting on the scope of the disclosed embodiments of the communication technique.

However, there are often gaps in the coverage offered by macrocells. Consequently, some users operate local transceivers that provide short-range communication in the cellular-telephone network. These so-called 'femto cells' provide short-range communication (e.g., up to 10 m) for a few individuals.

In addition, larger organizations (such as those with 50-60 users, which is a non-limiting numerical example) may operate local transceivers that provide communication in the cellular-telephone network over a range of 100 m. This intermediate-range coverage in the cellular-telephone network can be typically referred to as a 'small cell' as well.

One challenge for operators of cellular-telephone networks is maintaining network performance and quality. For example, it may be difficult to maintain the network performance and the quality of service in high density, indoor or crowded environments. While the use of femto cells and/or small cells can mitigate this challenge, there are still often circumstances where the network performance and quality of a cellular-telephone network is degraded. For example, time delays and uncertainty in receiving requested portions of an SLA band of frequencies (such as CBRS) can make it difficult to improve or optimize the communication performance in, e.g., a small cell. These challenges are addressed in the communication technique described below.

In the discussion that follows, Long Term Evolution or LTE (from the 3rd Generation Partnership Project of Sophia Antipolis, Valbonne, France) is used as an illustration of a data communication protocol in a cellular-telephone network that is used during communication between one or more radio nodes and an electronic device. Consequently, eNodeBs or eNBs are used as illustrative examples of the radio nodes. However, a wide variety of communication techniques or protocols may be readily used for the various embodiments. For example, an electronic device and a radio node may communicate frames or packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), a cellular-telephone or data network (such as using a third generation or 3G communication protocol, a fourth generation or 4G communication protocol, e.g., LTE, LTE Advanced or LTE-A, a fifth generation or 5G communication protocol, or other present or future developed advanced cellular communication protocol) and/or another type of wireless interface (such as communication protocol). Thus, the radio nodes may include: an eNodeB, a UMTS NodeB and RNC, an NR gNB or gNodeB, etc.

Moreover, a radio node may communicate with other radio nodes and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among electronic devices according to some embodiments. Notably, radio nodes 110 can communicate LTE data frames or packets using LTE with an electronic device 112 (which is sometimes referred to as 'user equipment' or UE, such as a cellular telephone and, more generally, a fixed or portable electronic device). Again, while LTE is used as an example of a cellular protocol, the embodiments herein are not so limited. Moreover, radio nodes 110 may also communicate (via wireless or wired communication, such as Ethernet, in network 114) with each other and with computer 124 (such as a SAS).

Figure 2:
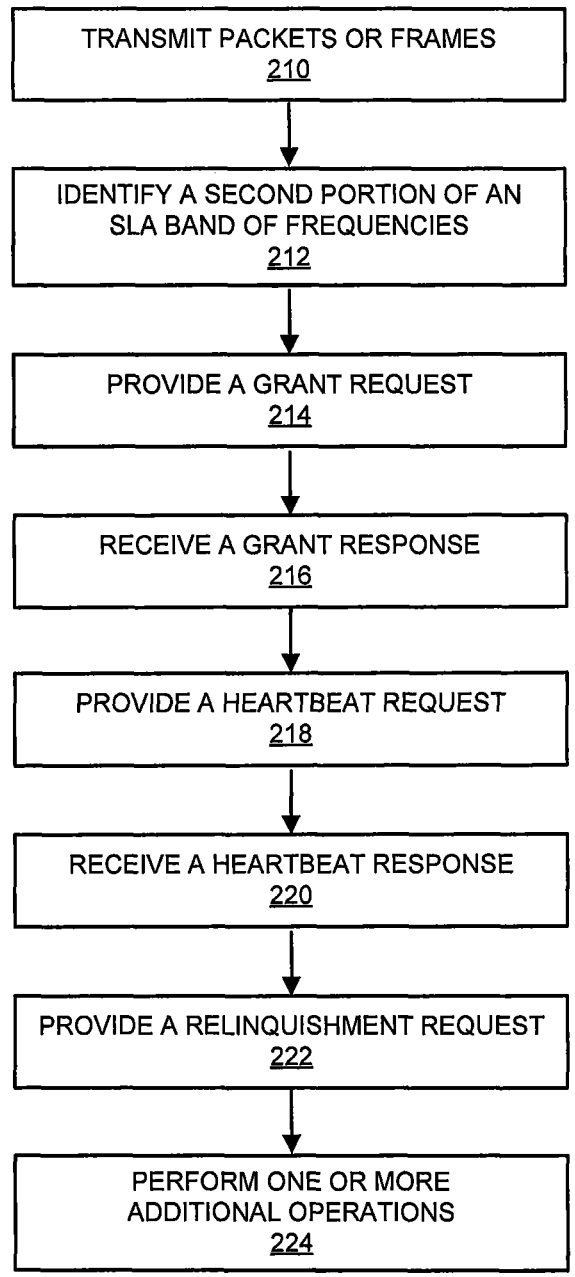
FIG. 2 is a flow diagram illustrating an example of a method for dynamically changing portions of a shared-license-access (SLA) band of frequencies using a radio node in FIG. 1 in accordance with an embodiment of the present disclosure.

As described further below with reference to FIGS. 2-4, one or more of radio nodes 110 may perform a communication technique by communicating with computer 124 via network 114. Using radio node 110-1 as an example, this radio node may provide a grant request to computer 124 to reserve a portion of a spectrum or bandwidth (such as a portion of the spectrum in an SLA band of frequencies or another band of frequencies, which is sometimes referred to as a 'channel') for its use. (In the discussion that follows, CBRS is used as an illustrative example of the communication technique.) For example, radio node 110-1 may request a grant to reserve 5, 10, 20, 40, 80, 100 or 150 MHz of spectrum in CBRS from computer 124. In response, computer 124 may provide a grant response to radio node 110-1 with approval of a grant for the requested portion of the SLA band of frequencies.

Then, radio node 110-1 may request from computer 124 authorization to transmit in the granted portion of the SLA band of frequencies. For example, radio node 110-1 may provide a keep-alive message (such as a heartbeat request) to computer 124 in order to request authorization to transmit in the granted portion of the SLA band of frequencies. When radio node 110-1 receives a keep-alive response (such as a heartbeat response) from computer 124, then radio node 110-1 may be authorized to transmit in the granted portion of the SLA band of frequencies until a transmit expire time has elapsed. In response, radio node 110-1 may wirelessly transmit one or more packets or frames to electronic device 112 using the approved and authorized portion of the SLA band of frequencies.

Subsequently, radio node 110-1 may identify another portion of the SLA band of frequencies with an improved communication-performance metric relative to the approved and authorized portion of the SLA band of frequencies. For example, radio node 110-1 may perform a wireless network scan of the remainder of the SLA band of frequencies (or one or more portions thereof) and may identify a portion in which an RSSI or RSRP of a carrier signal is increased relative to the RSSI or RSRP of a carrier signal in the currently approved and authorized grant for the portion of the SLA band of frequencies.

In response, radio node 110-1 may request, and, then, may receive, approval from computer 124 of a grant for the other portion of the SLA band of frequencies. However, instead of relinquishing the portion of the SLA band of frequencies when the grant is approved, radio node 110-1 may first obtain authorization from computer 124 for radio node 110-1 to use the other portion of the SLA band of frequencies. Notably, radio node 110-1 and computer 124 may exchange a heartbeat request and a subsequent heartbeat response that authorizes radio node 110-1 to use the other portion of the SLA band of frequencies. Then, after receiving the approval and the authorization for the other portion of the SLA band of frequencies, radio node 110-1 may provide a relinquishment request to computer 124 for the portion of the SLA band of frequencies. Moreover, radio node 110-1 may receive a relinquishment response from computer 124 that approves the relinquishment request.

In some embodiments, after receiving the authorization for the other portion of the SLA band of frequencies and prior to providing the relinquishment request, radio node 110-1 may wirelessly provide a notification to electronic device 112 of a transition from the portion of the SLA band of frequencies to the other portion of the SLA band of frequencies. For example, the notification may be provided in a system information block. This over-the-air notification may make the transition smoother, by alerting electronic device 112 in advance where to scan for radio node 110-1 (such as in the other portion of the SLA band of frequencies), thereby allowing electronic device 112 to avoid a deep scan of the entire SLA band of frequencies (such as a scan of 150 MHz in the CBRS).

The aforementioned operations in the communication technique may be repeated so that radio node 110-1 can dynamically adapt to changes in communication environment 108. For example, the communication technique may be performed once (such as when radio node 110-1 is turned on), periodically (such as, e.g., every 50 ms), as needed (such as the communication performance in the portion of the SLA band of frequencies has degraded) and/or continuously.

In this way, the communication technique may selectively and dynamically allow radio node 110-1 to improve or optimize communication performance in the network, without time delays or disruptions in service. Moreover, by providing the notification to electronic device 112, the communication technique may reduce the scan time needed for electronic device 112 to re-establish communication with radio node 110-1 using the other portion of the SLA band of frequencies.

In general, the wireless communication in FIG. 1 may be characterized by a variety of performance metrics, such as: a data rate for successful communication (which is sometimes referred to as 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

During the communication in FIG. 1, radio nodes 110 and electronic device 112 may wirelessly communicate while: transmitting access requests and receiving access responses on wireless channels, detecting one another by scanning wireless channels, establishing connections (for example, by transmitting connection requests and receiving connection responses), and/or transmitting and receiving frames that include packets (which may include information as payloads).

Figure 5:
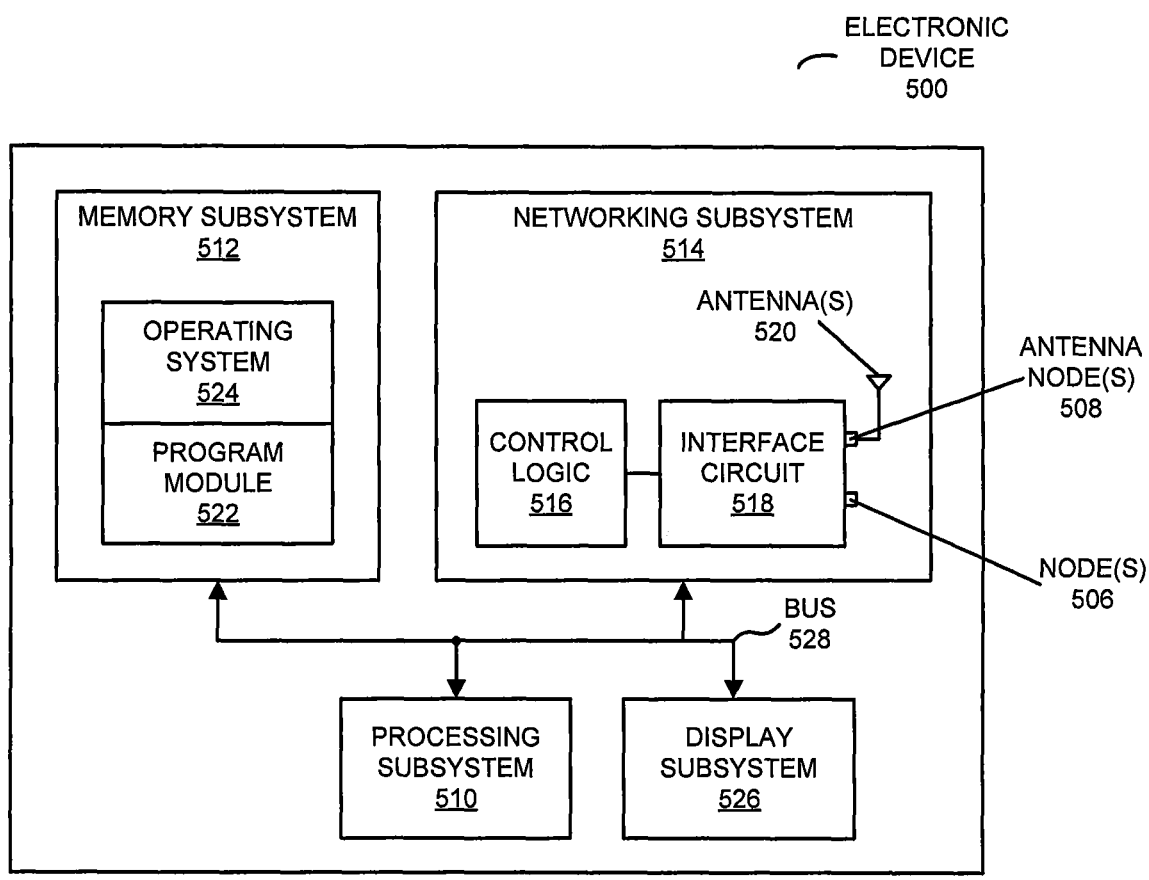
FIG. 5 is a block diagram illustrating an example of an electronic device in accordance with an embodiment of the present disclosure.

As described further below with reference to FIG. 5, radio nodes 110 and electronic device 112 may include subsystems, such as a networking subsystem, a memory subsystem and a processor subsystem. In addition, radio nodes 110 and electronic device 112 may include radios 118 in the networking subsystems. More generally, radio nodes 110 and electronic device 112 can include (or can be included within) any electronic devices with the networking subsystems that enable radio nodes 110 and electronic device 112 to wirelessly communicate with each other. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

Moreover, as can be seen in FIG. 1, wireless signals 120 (represented by a jagged line) are transmitted by radios 118 in radio nodes 110 and electronic device 112. For example, radio 118-1 in radio node 110-1 may transmit information (such as frames or packets) using wireless signals 12Q. These wireless signals are received by radios 118 in one or more other electronic devices (such as radio 118-2 in electronic device 112). This may allow radio node 110-1 to communicate information to other radio nodes 110 and/or electronic device 112. Note that wireless signals 120 may convey LTE frames or packets.

In the described embodiments, processing a frame that includes packets in radio nodes 110 and electronic device 112 may include: receiving the wireless signals with the frame; decoding/extracting the frame from the received wireless signals to acquire the frame; and processing the frame to determine information contained in the payload of the frame (such as the packet).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets.

We now describe embodiments of the method. FIG. 2 presents a flow diagram illustrating an example of a method 200 for dynamically changing a portion of an SLA band of frequencies, which may be performed by a radio node (such as one of radio nodes 110 in FIG. 1). During operation, an interface circuit in the radio node may optionally transmit packets or frames (operation 210) to the electronic device using a first portion of the SLA band of frequencies, where the first portion of the SLA band of frequencies is approved and authorized for use by the radio node. Then, the interface circuit may identify a second portion of the SLA band of frequencies (operation 212) with an improved communication-performance metric relative to the first portion of the SLA band of frequencies.

Moreover, a network circuit in the radio node may provide, to the computer, a grant request (operation 214) for the second portion of the SLA band of frequencies. Next, the network circuit may receive a grant response (operation 216) from the computer, where the grant response includes approval for a grant to the second portion of the SLA band of frequencies.

Furthermore, the network circuit may provide, to the computer, a heartbeat request (operation 218) for authorization to use the second portion of the SLA band of frequencies. In response, the network circuit may receive a heartbeat response (operation 220) from the computer that authorizes the radio node to use the second portion of the SLA band of frequencies.

Additionally, after receiving the approval (operation 216) and the authorization (operation 220) for the second portion of the SLA band of frequencies, the network circuit may provide, to the computer, a relinquishment request (operation 222) for the first portion of the SLA band of frequencies.

Note that the computer may include a SAS. Moreover, a given portion of the SLA band of frequencies may be included in a CBRS. Furthermore, identifying the second portion of the SLA band of frequencies may involve performing a network listen in the second portion of the SLA band of frequencies. Additionally, the communication-performance metric may include, e.g., one of: a RSSI of a carrier signal, or a RSRP of the carrier signal.

In some embodiments, the radio node optionally performs one or more additional operations (operation 224). For example, the network circuit may receive a relinquishment response from the computer that approves the relinquishment request. Moreover, after receiving the authorization for the second portion of the SLA band of frequencies and prior to providing the relinquishment request, the interface circuit may provide, to the electronic device, a notification of a transition from the first portion of the SLA band of frequencies to the second portion of the SLA band of frequencies. For example, the notification may be provided in a system information block.

In some embodiments of method 200, there may be additional or fewer operations. Furthermore, the order of the operations may be changed, and/or two or more operations may be combined into a single operation. For example, in other embodiments the relinquishment request (operation 222) may be sent prior to receipt of the heartbeat response (operation 220) or prior to the provision of the heartbeat request (operation 218).

Figure 3:
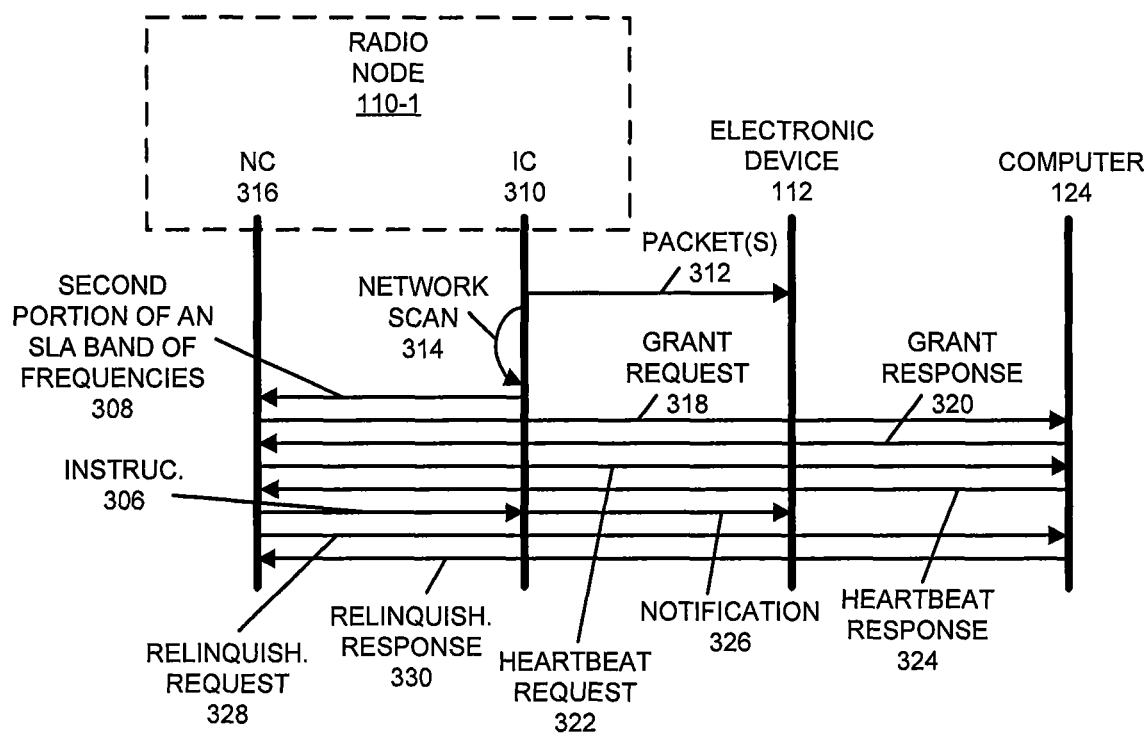
FIG. 3 is a drawing illustrating an example of communication among the electronic devices in FIG. 1 in accordance with an embodiment of the present disclosure.
Figure 4:
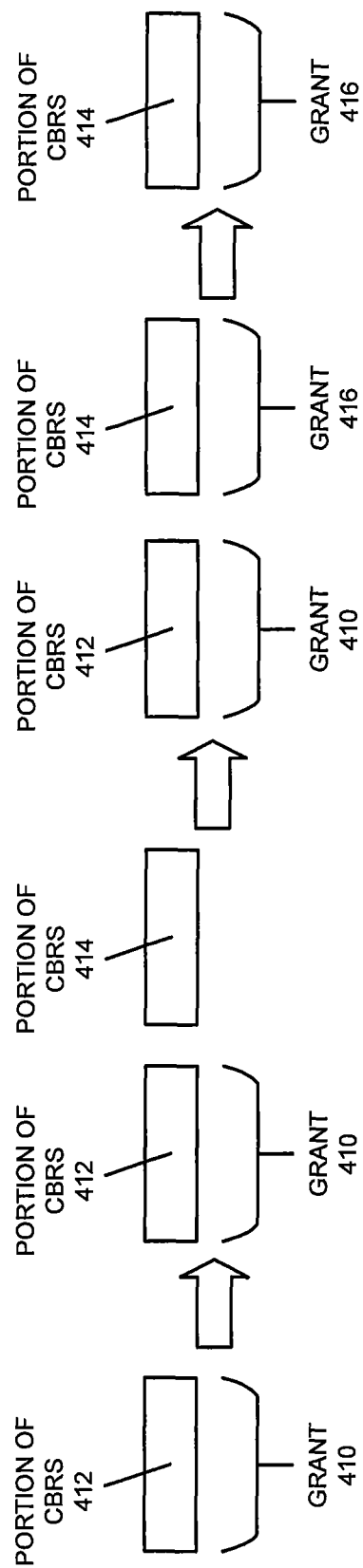
FIG. 4 is a drawing illustrating an example of a technique for dynamically changing portions of an SLA band of frequencies in accordance with an embodiment of the present disclosure.

Embodiments of the communication technique are further illustrated in FIG. 3, which presents a drawing illustrating an example of communication among radio node 110-1, electronic device 112 and computer 124. In FIG. 3, an interface circuit (IC) 310 in radio node 110-1 may communicate packets 312 or frames to electronic device 112 using a first portion of the SLA band of frequencies. Then, interface circuit 310 may perform a network scan 314 to identify a second portion of the SLA band of frequencies 308 with an improved communication-performance metric relative to the first portion of the SLA band of frequencies.

In response, a network circuit (NC) 316 in radio node 110-1 may provide a grant request 318 to computer 124 for the second portion of the SLA band of frequencies 308. After receiving grant request 318, computer 124 may provide a grant response 320 to radio node 110-1, where grant response 320 includes approval for a grant to the second portion of the SLA band of frequencies 308. Note that in some embodiments the network circuit 316 and the interface circuit 310 may comprise a single circuit.

Moreover, after receiving grant response 320, network circuit 316 may provide a heartbeat request 322 to computer 124 for authorization to use the second portion of the SLA band of frequencies 308. Then, after receiving heartbeat request 322, computer 124 may provide a heartbeat response 324 to radio node 110-1 that authorizes radio node 110-1 to use the second portion of the SLA band of frequencies 308.

Next, after receiving heartbeat response 322, network circuit 316 may provide an instruction 306 to interface circuit 310. In response, interface circuit 310 may provide a notification 326 to electronic device 112 of a transition from the first portion of the SLA band of frequencies to the second portion of the SLA band of frequencies 308. This notification may allow electronic device 112 to know, in advance, where to scan for radio node 110-1 (i.e., in the second portion of the SLA band of frequencies 308).

Furthermore, network circuit 316 may then provide a relinquishment request 328 to computer 124 for the first portion of the SLA band of frequencies. Additionally, after receiving relinquishment request 328, computer 124 may provide a relinquishment response 330 to radio node 110-1 that approves relinquishment request 328.

While FIG. 3 illustrates communication between components using unidirectional or bidirectional communication with lines having single arrows or double arrows, in general the communication in a given operation in this figure may involve unidirectional or bidirectional communication.

In some embodiments of the communication technique, a CBSD may transition from a first portion of a CBRS to a second portion of a CBRS without disruption of service. This is illustrated in FIG. 4, which presents a drawing illustrating an example of a technique for dynamically changing a portion of a CBRS granted to a CBSD by a SAS. Notably, the CBSD may have an approved an authorized grant 410 for a portion 412 of the CBRS from the SAS. Then, the CBSD may perform a network listen to identify a portion 414 of the CBRS with an improved RSSI or RSRP of a carrier signal. Next, the CBSD may request and receive and approved an authorized grant 416 for portion 414 of the CBRS from the SAS. Next, the CBSD may notify the SAS that it is relinquishing grant 410 for the portion 412 of the CBRS, and the CBSD may switch to providing service using the approved and authorized portion 414 of the CBRS.

Note that the CBSD may, e.g., perform the network listen continuously or periodically to look for better channels. In other embodiments, the CBSD may perform the network listen to look for better channels based on another criteria (e.g., when the performance of using the current grant falls below a predefined threshold). Moreover, by only relinquishing a currently approved and authorized grant after a new grant is approved and authorized, the communication technique may help ensure that there is no downtime in the service provided by the CBSD.

We now describe embodiments of an electronic device, which may perform at least some of the operations in the communication technique. FIG. 5 presents a block diagram illustrating an example of an electronic device 500 in accordance with some embodiments, such as one of radio nodes 110, electronic device 112 computer 124. This electronic device includes processing subsystem 510, memory subsystem 512, and networking subsystem 514. Processing subsystem 510 includes one or more devices configured to perform computational operations. For example, processing subsystem 510 can include one or more microprocessors, graphics processing units (GPUs), ASICs, microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs or program modules may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 (which may include a wireless interface circuit and/or a network circuit) and one or more antennas 520 (or antenna elements). (While FIG. 5 includes one or more antennas 520, in some embodiments electronic device 500 includes one or more nodes, such as antenna nodes 508, e.g., a pad or a connector, which can be coupled to the one or more antennas 520, or nodes 506, which can be coupled to a wired or optical connection or link. Thus, electronic device 500 may or may not include the one or more antennas 520. Note that the one or more nodes 506 and/or antenna nodes 508 may constitute input(s) to and/or output(s) from electronic device 500.) For example, networking subsystem 514 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 500 may be adapted or changed using pattern shapers (such as reflectors) in one or more antennas 520 (or antenna elements), which can be independently and selectively electrically coupled to ground to steer the transmit antenna pattern in different directions. Thus, if one or more antennas 520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an eNodeB, a controller, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 514. The integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated 2Q circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and an LTE communication protocol as an illustrative example, in other embodiments a wide variety of communication protocols and, more generally, wireless communication techniques may be used. For example, instead of Ethernet, a communication protocol that is compatible with the Internet Protocol is used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Thus, the communication technique may be implemented at runtime of program module 522. Alternatively or additionally, at least some of the operations in the communication technique may be implemented in a physical layer, such as hardware in interface circuit 518.

While examples of numerical values are provided in the preceding discussion, in other embodiments different numerical values are used. Consequently, the numerical values provided are not intended to be limiting.

While the preceding embodiments illustrated the use of the communication technique with CBRS (e.g., a frequency band near 3.5 GHz), in other embodiments of the communication technique different wireless signals and/or different frequency band(s) may be used. For example, the wireless signals may be communicated in one or more bands of frequencies, including: 900 MHz, 2.4 GHz, 5 GHz, 60 GHz, and/or a band of frequencies used by LTE or another cellular-telephone communication protocol.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A radio node, comprising:
  a first node or connector configured to communicatively couple to an antenna or an antenna element;
  a second node or connector configured to communicatively couple to a network;
  an interface circuit, communicatively coupled to the first node or connector, configured to communicate with an electronic device;
  a network circuit, communicatively coupled to the second node or connector, configured to communicate with a computer, wherein the radio node is configured to:
    transmit, from the interface circuit, packets or frames addressed to the electronic device using a first portion of a shared-license-access (SLA) band of frequencies, wherein the first portion of the SLA band of frequencies is approved and authorized for use by the radio node;
    identify, using the interface circuit, a second portion of the SLA band of frequencies with an improved communication-performance metric relative to the first portion of the SLA band of frequencies;
    provide, from the network circuit and addressed to the computer, a grant request for the second portion of the SLA band of frequencies;
    receive, at the network circuit, a grant response associated with the computer, wherein the grant response comprises approval for a grant to the second portion of the SLA band of frequencies;
    provide, from the network circuit and addressed to the computer, a heartbeat request for authorization to use the second portion of the SLA band of frequencies;
    receive, at the network circuit, a heartbeat response associated with the computer that authorizes the radio node to use the second portion of the SLA band of frequencies; and
    after receiving the approval and the authorization for the second portion of the SLA band of frequencies, provide, from the network circuit and addressed to the computer, a relinquishment request for the first portion of the SLA band of frequencies.

2. The radio node of claim 1, wherein the computer comprises a spectrum allocation server (SAS).

3. The radio node of claim 1, wherein a given portion of the SLA band of frequencies is associated with a Citizens Broadband Radio Service (CBRS).

4. The radio node of claim 1, wherein communication with the computer comprises wired communication.

5. The radio node of claim 1, wherein the radio node comprises: an Evolved Node B (eNodeB), a Universal Mobile Telecommunications System (UMTS) NodeB and radio network controller (RNC), or a New Radio (NR) gNB or gNodeB.

6. The radio node of claim 1, wherein the radio node is configured to receive, at the network circuit, a relinquishment response associated with the computer that approves the relinquishment request.

7. The radio node of claim 1, wherein identifying the second portion of the SLA band of frequencies comprises performing a network listen in the second portion of the SLA band of frequencies.

8. The radio node of claim 1, wherein the communication-performance metric comprises: a received signal strength indication (RSSI) of a carrier signal, or a reference signals received power (RSRP) of the carrier signal.

9. The radio node of claim 1, wherein, after receiving the authorization for the second portion of the SLA band of frequencies and prior to providing the relinquishment request, the radio node is configured to provide, from the interface circuit and addressed to the electronic device, a notification of a transition from the first portion of the SLA band of frequencies to the second portion of the SLA band of frequencies.

10. The radio node of claim 9, wherein the notification is provided in a system information block.

11. A method for dynamically changing portions of a shared-license-access (SLA) band of frequencies, comprising:
  by a radio node:
    transmitting, from an interface circuit in the radio node, packets or frames addressed to an electronic device using a first portion of the SLA band of frequencies, wherein the first portion of the SLA band of frequencies is approved and authorized for use by the radio node;

identifying, using the interface circuit, a second portion of the SLA band of frequencies with an improved communication-performance metric relative to the first portion of the SLA band of frequencies;

providing, from a network circuit in the radio node and addressed to a computer, a grant request for the second portion of the SLA band of frequencies;

receiving, at the network circuit, a grant response associated with the computer, wherein the grant response comprises approval for a grant to the second portion of the SLA band of frequencies;

providing, from the network circuit and addressed to the computer, a heartbeat request for authorization to use the second portion of the SLA band of frequencies;

receiving, at the network circuit, a heartbeat response associated with the computer that authorizes the radio node to use the second portion of the SLA band of frequencies; and after receiving the approval and the authorization for the second portion of the SLA band of frequencies, providing, from the network circuit and addressed to the computer, a relinquishment request for the first portion of the SLA band of frequencies.

12. The method of claim 11, wherein identifying the second portion of the SLA band of frequencies comprises performing a network listen in the second portion of the SLA band of frequencies.

13. The method of claim 11, wherein the communication-performance metric comprises: a received signal strength indication (RSSI) of a carrier signal, or a reference signals received power (RSRP) of the carrier signal.

14. The method of claim 11, wherein the method comprises, after receiving the authorization for the second portion of the SLA band of frequencies and prior to providing the relinquishment request, providing, from the interface circuit and addressed to the electronic device, a notification of a transition from the first portion of the SLA band of frequencies to the second portion of the SLA band of frequencies.

15. A radio node, comprising:
a first node or connector configured to communicatively couple to an antenna or an antenna element;
a second node or connector configured to communicatively couple to a network;
an interface circuit communicatively coupled to the first node or connector;
a network circuit, communicatively coupled to the second node or connector, configured to communicate with a computer, wherein the radio node is configured to:
    identify, using the interface circuit, a second portion of a shared-license-access (SLA) band of frequencies with an improved communication-performance metric relative to a first portion of the SLA band of frequencies, wherein the first portion of the SLA band of frequencies is approved and authorized for use by the radio node;
    acquiring, via the network circuit, an approved grant for the second portion of the SLA band of frequencies, wherein the approved grant is associated with the computer;
    obtaining, via the network circuit, authorization to use the approved grant for the second portion of the SLA band of frequencies, wherein the authorization is associated with the computer; and
    after receiving the approval and the authorization for the second portion of the SLA band of frequencies, provide, from the network circuit and addressed to the computer, a relinquishment request for the first portion of the SLA band of frequencies.

* * * * *